Feb. 12, 1952     E. R. SMITH     2,585,510
DOUBLE GRIP COLLET-TYPE CHUCK
Filed Nov. 8, 1947
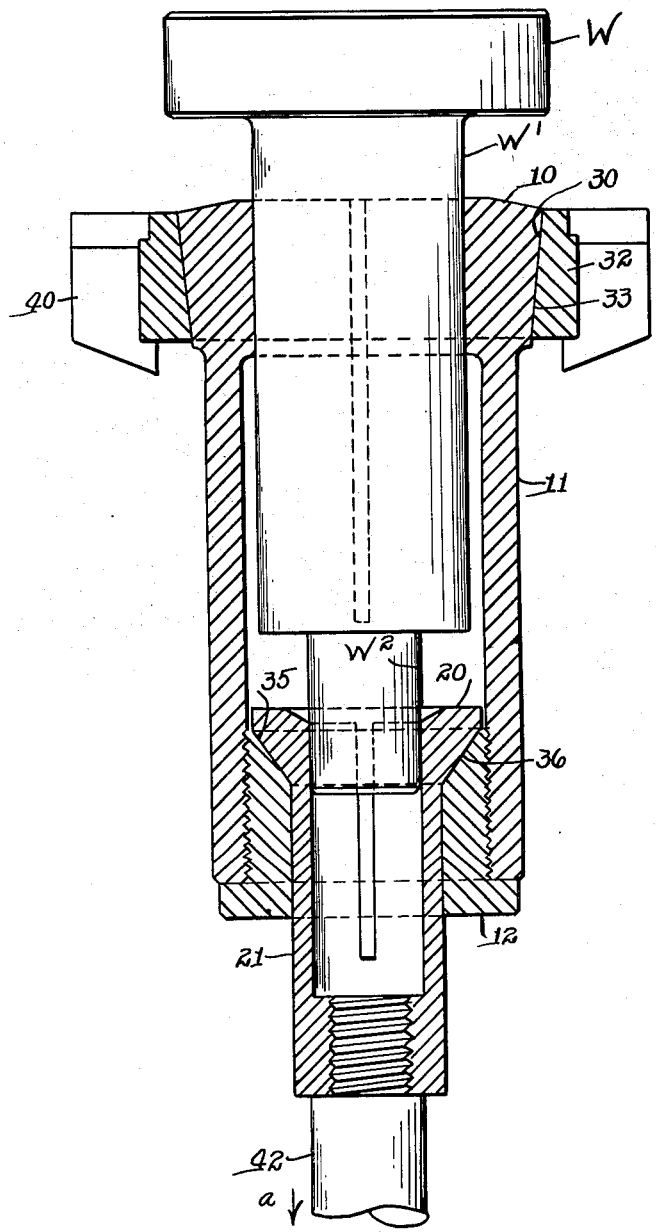
INVENTOR.
Edwin R. Smith.
BY Chas. T. Hawley
ATTORNEYS.

Patented Feb. 12, 1952

2,585,510

UNITED STATES PATENT OFFICE 2,585,510

DOUBLE GRIP COLLET-TYPE CHUCK

Edwin R. Smith, Seneca Falls, N. Y., assignor to Seneca Falls Machine Company, Seneca Falls, N. Y., a corporation of Massachusetts Application November 8, 1947, Serial No. 784,826

4 Claims. (Cl. 279—46)

This invention relates to chucks of the collet type as used in lathes, grinding machines and other machine tools. In such chucks, the work is gripped and centered by simultaneously contracting an annular set of collet jaws against an external surface of the work.

It is found that a piece of work may be much more firmly held in such a chuck if it is gripped and centered at two axially spaced points, such as at one end and at a second point substantially spaced axially from said end.

It is the general object of the present invention to provide a collet-type chuck in which a piece of work may thus be gripped and firmly supported at two points which are substantially spaced apart axially.

A further object of the invention is to provide a chuck having two sets of collet jaws and having means for closing said two sets of jaws successively and in predetermined order.

My invention further relates to arrangements and combinations of parts which will be hereinafter described and more particularly pointed out in the appended claims.

A preferred form of the invention is shown in the drawings in which the figure is a sectional elevation of my improved chuck.

In the drawing, I have shown a piece of work W mounted within an annular set of collet jaws 10 formed by deeply slotting a sleeve 11. The lower end of the sleeve is threaded on the outer surface of a bushing 12. A second annular set of collet jaws 20 are formed in a slotted sleeve 21 which is slidable in the bushing 12 previously described.

The external surfaces 30 of the collet jaws 10 are conically disposed and engage a ring 32 having a similar internal conical surface 33. The outer surfaces of the jaws 20 are similarly provided with conical surfaces 35 which engage a conical seat 36 in the bushing 12.

The engaging surfaces 30 and 33 have a relatively slight incline, while the engaging surfaces 35 and 36 are disposed at a relatively abrupt angle.

The bearing ring 32 is mounted in a rotating spindle or quill 40 and rotates therewith. A pull rod 42 may be threaded in the lower end of the sleeve 21.

In the use of my improved chuck, portions W' and W2 are loosely inserted in the collet jaws 10 and 20, which jaws are of such sizes as to receive the work with slight clearance. Pressure is then applied through the pull rod 42 in the direction of the arrow a. As the angle of the surfaces 35 and 36 is much more abrupt than the angle of the surfaces 30 and 33, the first effect of this rearward pull is to draw the collet jaws 10 into the ring 32 and to thereby tighten the jaws 10 against the portion W' of the work W.

When the jaws 10 are thus firmly engaged, further movement of the pull rod 42 in the same direction will cause the jaws 20 to be forced inward, thus gripping the portion W2 of the work W.

The work is thus firmly supported by the jaws 10 and 20 at two points which are substantially spaced axially of the work, and firm engagement of the work by both sets of jaws is assured. The difference in angle of the engaging surfaces effects successive application of the collet jaws and in a predetermined order.

The work is thus much more firmly and stiffly supported than is the case where the work is gripped at a single point only.

Having thus described my invention and the advantages thereof, I do not wish to be limited to the details herein disclosed, otherwise than as set forth in the claims, but what I claim is:

1. A double grip collet chuck comprising two axially spaced sets of work-engaging collet jaws of larger and smaller diameter respectively, and a single operating member effective by continued movement in one direction to first close the outer and larger set of jaws on a piece of work positioned therein and thereafter effective to close the inner and smaller set of jaws on the same work piece.

2. A double grip collet chuck comprising two axially spaced sets of work-engaging collet jaws of larger and smaller diameter respectively, and a single operating member effective to first close the outer and larger set of jaws on a piece of work positioned therein by initial axial movement of said operating member, and effective to thereafter close the inner and smaller set of jaws on the same work piece by further axial movement of the same operating member in the same direction.

3. A double grip collet chuck comprising a ring fixed in said chuck and having a tapered inner bearing surface, a sleeve axially movable in said chuck and carrying a first set of collet jaws which are slidable in said ring and which engage said bearing surface, said sleeve also having a tapered bearing surface of steeper slope than the bearing surface of said ring, a member slidable axially in said sleeve and carrying a second set of collet jaws having tapered outer surfaces engaging the tapered bearing surface in said sleeve, and means to move said member axially and to thereby render said member effective to close said first and second sets of collet jaws successively on a single piece of work positioned in said chuck.

4. A double grip collet chuck comprising a ring fixed in said chuck and having a tapered internal bearing surface, a sleeve axially slidable in said chuck and slotted at one end to provide a first set of collet jaws which are positioned to seat against the bearing surface of said ring, said sleeve also having a tapered internal bearing surface adjacent the other end which is of steeper slope than the bearing surface of said ring, a tubular member slidable axially in said sleeve and slotted to provide a second set of collet jaws having tapered outer surfaces engaging the tapered internal bearing surface in said sleeve, and means to move said tubular member axially to effect closure of said first and second sets of collet jaws successively on a single piece of work positioned in said chuck.

EDWIN R. SMITH.

REFERENCES CITED

The following references are of record in the file of this patent:

UNITED STATES PATENTS

| Number | Name | Date |
| --- | --- | --- |
| 2,227,620 | Armitage et al. | Jan. 7, 1941 |

FOREIGN PATENTS

| Number | Country | Date |
| --- | --- | --- |
| 190,365 | Great Britain | Dec. 21, 1922 |